Dec. 12, 1967  H. J. VAN WUYCKHUYSE  3,357,686
MACHINE FOR SHAKING MOULDS FILLED WITH CONCRETE
Filed Feb. 4, 1966                    3 Sheets-Sheet 1
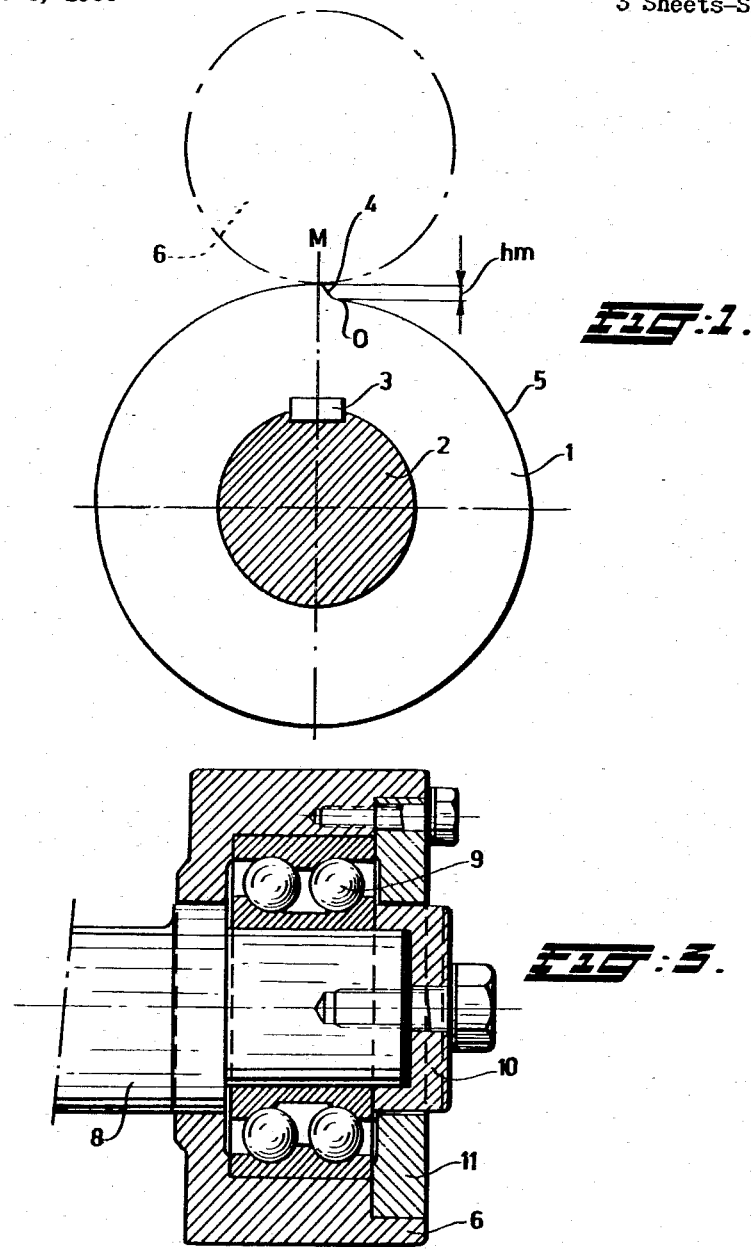
INVENTOR:
HENDRIK J. VAN WUYCKHUYSE
BY
Breitenfeld & Levine
ATTORNEYS

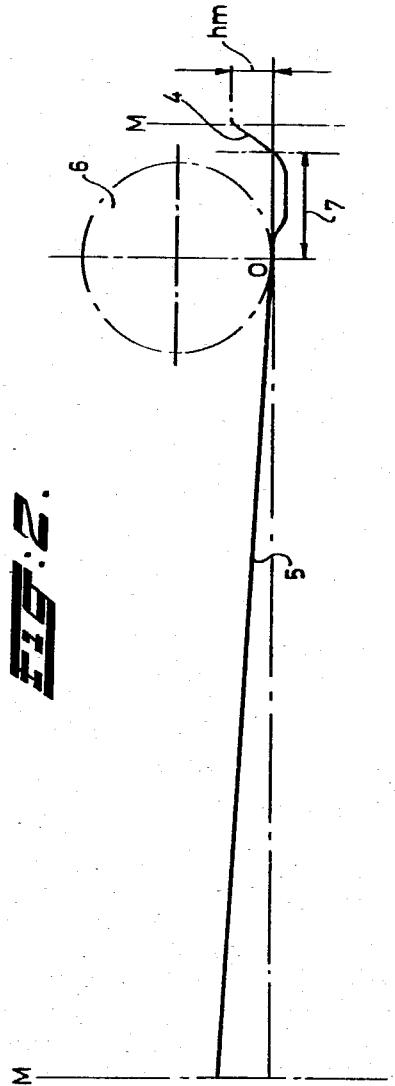

United States Patent Office 3,357,686
Patented Dec. 12, 1967

3,357,686
MACHINE FOR SHAKING MOULDS FILLED
WITH CONCRETE
Hendrik J. Van Wuyckhuyse, Zwijndrecht, Netherlands,
assignor to N.V. Schokbeton, Zwijndrecht, Netherlands,
a limited-liability company
Filed Feb. 4, 1966, Ser. No. 525,195
Claims priority, application Netherlands, Feb. 5, 1965,
65—1,520
3 Claims. (Cl. 259—91)

This invention relates to a machine for shaking moulds filled with concrete, comprising a table having means for securing a mould for the concrete article thereupon, said table being disposed for making up and down movements by being freely supported upon a set of driven cams, which roller cams are rotatably mounted in a stationary base. Upon rotation of the roller cams, the table is gradually lifted by the cam profile, and after reaching the highest point of the cams, the table drops freely upon an abutment, since after the highest point of the roller cams, the profile thereof declines sharply. The shaking movement of the table improves the compacting of the concrete in the mould fixed upon the table.

In a known machine of this type, the profile of the roller cams when contemplated in a direction perpendicular to the axis of the cam, is composed of an arc of two circles having a different diameter, said arcs of the two circles registering with each other at one end, whereas the other ends are joined by a short radial line. Only the part of the cam profile near its top cooperates with the table during the rotation of the cams since the above-mentioned abutment is so disposed that the table remains free from the roller cams during the greater portion of their revolution. The part of the table which contacts the roller cams is composed of freely rotatable rollers (so-called followers) mounted underneath the table. When the roller cams rotate, the followers of the table impact against the relatively sharply inclined arc portion of the roller cams, so that the table is suddenly pushed upward with a relatively sharp acceleration. Both facts combined, namely on the one hand the relatively small portion of the circumference of the roller cams, which cooperates with the followers, and on the other hand the relatively sharp acceleration to be imparted to the table, dictate the use of a relatively large power for imparting the shaking movement and moreover, the movement includes besides the aimed regular shocks also rather heavy secondary shocks.

The present invention aims at preventing the above disadvantages and this is obtained in that according to the invention the profile of the circumference of the roller cams is approximately a so-called inclined sine curve, whereas the lift of the curve and the location of the abutment for the table are so correlated that the follower rollers of the table contact the roller cams over almost their complete revolution.

The steep leg between both extremities of the sine curve is of course the portion of the curve which follows the point of maximum elevation, and the remainder of the circumference of the cam is formed by the relatively flat leg of the sine curve. The shape of the sine curve is so chosen that when the upper followers leave the point of maximum elevation of the roller cams, the table is still capable of freely falling upon the abutment, but immediately thereafter, the followers contact again the flat leg of the sine curve which should extend over almost the complete circumference of the cam, in the case that there is only one repeat of the cam profile over the total circumference. Analogous considerations apply when there are two or more repeats of the sine curve over the total circumference.

Accordingly, there is only one impact of the table against the abutment, after which the followers take up contact again wtih roller cams, without any noteworthy impact against the cam profile at the beginning of their cooperation. The lifting of the table is very gradual without a sudden acceleration. The invention prevents on the one hand the occurrence of secondary shocks of the table so that the primary falling movement of the table has an optimum effect upon the concrete, and on the other hand, the power required and the wear on the machine parts are low.

The foregoing and other objects and advantages of the invention will appear in the description to follow. In the description reference is made to the accompanying drawings, which form a part hereof, and in which there is shown by way of illustration and not of limitation a specific form in which the invention may be embodied.

In the drawings:

FIG. 1 is a front view of a roller cam according to the invention.

FIG. 2 shows the profile of the cam of FIG. 1 when the basic circumference is developed into a flat plane together with the cooperating follower roller FIG. 3 is an axial section of the follower roller, mounted upon the table.

Figure 4:
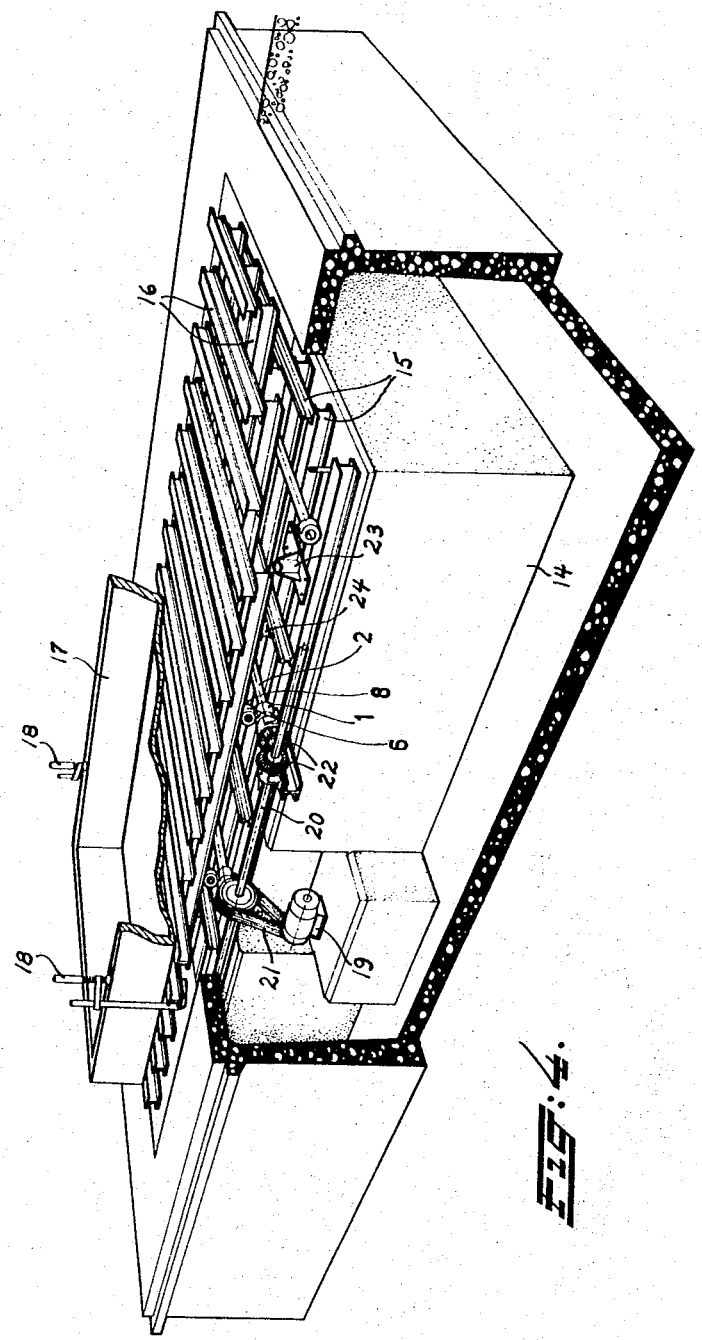
FIG. 4 is a perspective view, with parts broken away, of a shaking machine incorporating the present invention.

Referring to FIG. 4, the shaking machine to which the invention is applied is conventional, and includes a stationary base 14 carrying on its upper face a series of crossed rails 15 forming a supporting frame fixed to the base. Arranged above the supporting frame is a series of crossed rails 16 forming the shaking table. A mold 17, adapted to be filled with concrete, is mounted on the table 16 by means of clamps 18. An electric motor 19 rotates a main drive shaft 20 via belts 21, and the rotation is transmitted to shafts 2 carrying the cams 1 via bevel gears 22. Follower rollers 6 are carried by shafts 8 mounted on the under side of the table 16, and the vertical movement of the table is guided by a bushing 23 fixed to the support frame 15 which slidably accommodates a pin (not shown) projecting downwardly from the underside of the table. Abutment rails 24 fixed to the under side of the table 16 strike the upper rails of the support frame 15 to limit the downward movement of the table.

The roller-cam 1 is mounted on a driven shaft 2 by means of a key 3. The cam 1 is generally cylindrical, but its outer circumference has a profile which, when the cam is contemplated in side view and the basical circumference of the cam profile is developed into a flat plane (see FIG. 2), has approximately the shape of a so-called inclined sine curve with a short steep leg and a long flat leg. In FIGS. 1 and 2, the point of maximum height is situated in the vertical median plane of the cam 1 (indicated by the dot-and-dash line M), and progressing from this line, the steep leg 4 of the sine curve is inclined inwardly of the roller cam over a height *hm* and over an arc of a few degrees of the circumference only, and thereupon, the flat leg 5 of the sine curve inclines outwardly of the roller cam over the remainder of the circumference thereof, until it reaches the highest point of the curve again in M.

The shaft 2 which carries the cam 1, is mounted for rotation in a stationary base and it is driven at a uniform speed e.g. by an electromotor. Above the roller cam 1 there is mounted a follower roller 6 (shown by the dot-and-dash line in FIG. 2 and in detail in FIG. 3) for cooperation with the cam 1 so that upon rotation of the latter it contacts the cam 1 over most of its revolution, with the exception of the steep leg 4 of the sine curve and the first short section 7 of the flat leg of the sine curve which is inactive due to the contact of the table with the abutment. Thus, upon rotation of the cam 1, it will only contact the follower 6 in point 0 (in FIG. 2) and upon further rotation of the roller 1, it lifts the follower 6 gradually until the point M of maximum lifting height. After point M has passed underneath the follower 6 the latter drops freely under the influence of the gravitational force until the table contacts the abutment. The follower 6 only touches the cam 1 again in point 0.

As previously said, the shaft 2 of the cam 1 is mounted in a stationary base and in general there are at least two shafts 2 mounted in spaced parallel positions in said base, each shaft 2 carrying a cam 1 at each end, whereas corresponding pairs for followers 6 are mounted in spaced parallel positions underneath a table which extends freely in horizontal position over said base and is supported by the followers 6 which rest upon the cams 1. As shown in FIG. 3, each follower 6 is mounted on an end of a shaft 8 via a ball-bearing 9, the inner and outer races of which are held by a central and an annular cover 10 and 11 respectively. The shafts 8 are secured underneath the table. Upon each revolution of the cams 1, the table which is carried by the followers 6 is thus moved gradually upward and drops freely downward again. The free fall of the table is checked by a series of abutments which hold the table until the followers 6 contact the cams 1 again. Upon the table, mould for a concrete article can be fixed so that in operation of the device, the mould will be shaken so as to improve the compacting of the concrete poured into this mould.

In a practical example, the maximum height difference of the cams 1 is 4 mm., whereas the free fall $hm$ of the table between the highest point and the point in which the fall is checked by the abutments is 3 mm. The equation of the sine curve is:

$$h = hm(t/tm - 1/2\pi \sin t/tm \cdot 2\pi)$$

in which $t$=time lapsed between first contact of follower 6 with the beginning of the profile on cam 1. From this follows that at any moment the acceleration $a$ is:

$$a = 2\pi hm/tm^2 \cdot \sin t/tm \cdot 2\pi$$

so that when $t=0$, the acceleration $a=0$, and when $t=tm$ the acceleration $a=0$, so that both at the beginning and the end of the lifting movement, there are no shocks and the movement is very gradual.

It is observed that the circumference of the cam roller 1 may e.g. be composed of two or more repeats of the sine curve, so that a proportional part of a revolution causes one up and down movement of the table.

While a preferred embodiment of the invention has been shown and described, it is to be understood that changes and variations may be made without departing from the spirit and scope of the invention as defined in the appended claims.

What I claim is:

1. A machine for shaking molds filled with concrete, comprising a stationary base, a table having means for securing a mold for a concrete article thereupon, means for guiding said table for free upon and down movement with respect to said base, cams rotatably mounted on said base beneath said table, a follower roller cooperating with each cam and carried by said table, and an abutment on said base in the path of downward movement of said table, the profile of the circumference of each cam approximating at least one inclined sine curve, said curve extending around almost the entire periphery of each cam, the remaining part being composed of a short steep leg and a short lower section merging into the beginning of said inclined sine curve.

2. Machine according to claim 1, characterized in that each steep leg of the cam profile extends over an arc of only a few degrees of the circumference of this roller cam.

3. Machine according to claim 2, characterized in that the steep leg and the following short section of the cam curve permit a free fall of the follower roller.

References Cited

UNITED STATES PATENTS

| | | | |
|---|---|---|---|
| 991,381 | 5/1911 | Simmers | 259—91 |
| 1,947,398 | 2/1934 | Stuhler | 259—91 |

ROBERT W. JENKINS, *Primary Examiner.*